United States Patent
Liu et al.

(10) Patent No.: US 11,878,267 B2
(45) Date of Patent: Jan. 23, 2024

(54) MIXED MATRIX MEMBRANE (MMM) AND METHOD OF $H_2/CO_2$ GAS SEPARATION BY USING MMM

(71) Applicant: NANJING TECH UNIVERSITY, Jiangsu (CN)

(72) Inventors: Gongping Liu, Jiangsu (CN); Guining Chen, Jiangsu (CN); Wanqin Jin, Jiangsu (CN)

(73) Assignee: NANJING TECH UNIVERSITY, Jiangsu (CN)

( * ) Notice: Subject to any disclaimer, the term of this patent is extended or adjusted under 35 U.S.C. 154(b) by 0 days.

(21) Appl. No.: 18/165,235

(22) Filed: Feb. 6, 2023

(65) Prior Publication Data
US 2023/0277979 A1 Sep. 7, 2023

(30) Foreign Application Priority Data
Mar. 7, 2022 (CN) .......................... 202210222277.3

(51) Int. Cl.
*B01D 53/22* (2006.01)
*B01D 67/00* (2006.01)
(Continued)

(52) U.S. Cl.
CPC ..... *B01D 53/228* (2013.01); *B01D 67/00793* (2022.08); *B01D 67/00931* (2022.08);
(Continued)

(58) Field of Classification Search
None
See application file for complete search history.

(56) References Cited

U.S. PATENT DOCUMENTS

| | | | |
|---|---|---|---|
| 2009/0131242 A1* | 5/2009 | Liu | B01D 69/148 502/4 |
| 2009/0155464 A1* | 6/2009 | Liu | B01D 69/148 427/243 |

(Continued)

OTHER PUBLICATIONS

Zhang, Yanfeng et al., "Gas permeability properties of Matrimid(R) membranes containing the metal-organic framework Cu-BPY-HFS", Journal of Membrane Science, 2008, 313, pp. 170-181. (Year: 2008).*

(Continued)

*Primary Examiner* — Jason M Greene
(74) *Attorney, Agent, or Firm* — JCIPRNET

(57) ABSTRACT

$M(SiF_6)(pyz)_3$ (M=Cu, Zn, Co, or Ni) has a pore size between a size of $H_2$ and a size of $CO_2$, and thus exhibits prominent screening performance for $H_2/CO_2$. A strong interaction between $Cu(SiF_6)(bpy)_2$ and a $CO_2$ molecule can hinder the transport of the $CO_2$ molecule. The above two MOFs both can achieve the $H_2/CO_2$ separation. By preparing a dense $MSiF_6$/polymer layer, $MSiF_6$ is uniformly dispersed in the polymer and is fixed, and subsequently, $MSiF_6$ is converted into $M(SiF_6)(pyz)_3$ or $Cu(SiF_6)(bpy)_2$ by interacting with an organic ligand. Through vapor-induced in-situ conversion, MOF particles can be well dispersed without interface defects between the MOF particles and the polymer. Even at a doping amount of 80%, the mechanical flexibility and stability of the MMM can still be retained.

8 Claims, 5 Drawing Sheets

(51) Int. Cl.
  *B01D 71/52* (2006.01)
  *B01D 69/02* (2006.01)
  *B01D 69/14* (2006.01)
  *B01D 71/02* (2006.01)
  *B01J 20/22* (2006.01)
  *B01J 20/28* (2006.01)

(52) U.S. Cl.
  CPC .......... *B01D 69/02* (2013.01); *B01D 69/148* (2013.01); *B01D 71/028* (2013.01); *B01D 71/5211* (2022.08); *B01J 20/226* (2013.01); *B01J 20/28026* (2013.01); *B01D 2253/204* (2013.01); *B01D 2256/16* (2013.01); *B01D 2257/504* (2013.01); *B01D 2323/081* (2022.08); *B01D 2323/12* (2013.01); *B01D 2323/14* (2013.01); *B01D 2323/2189* (2022.08); *B01D 2323/36* (2013.01); *B01D 2323/50* (2013.01); *B01D 2325/04* (2013.01)

(56) References Cited

U.S. PATENT DOCUMENTS

2016/0074814 A1* 3/2016 Park .................... B01D 53/228
                                                              210/500.33
2017/0203261 A1* 7/2017 Eddaoudi ............... B01D 69/02
2019/0168173 A1* 6/2019 Tsapatsis ............. B01D 53/228

OTHER PUBLICATIONS

Heqing Gong et al., "Separations of binary mixtures of C02/CH4 and C02/N2 with mixed-matrix membranes containing Zn(pyrz)2(SiF6) metal-organic framework", Journal of Membrane Science, vol. 495, Aug. 12, 2015, pp. 169-175.

Yanfeng Zhang et al., "Gas permeability properties of Matrimid® membranes containing the metal-organic framework Cu-BPY-HFS", Journal of Membrane Science, vol. 313, Jan. 16, 2008, pp. 170-181.

* cited by examiner

MIXED MATRIX MEMBRANE (MMM) AND METHOD OF $H_2/CO_2$ GAS SEPARATION BY USING MMM

CROSS-REFERENCE TO RELATED APPLICATION

This application claims the priority benefit of China application serial no. 202210222277.3, filed on Mar. 7, 2022. The entirety of the above-mentioned patent application is hereby incorporated by reference herein and made a part of this specification.

BACKGROUND

Technical Field

The present disclosure belongs to the technical field of gas separation membranes, and specifically relates to a metal-organic framework (MOF)-based mixed matrix membrane (MMM), and a preparation method and use thereof.

Description of Related Art

With the growth of population and the increasing degree of industrialization, the human demand for energy is increasing. The energy consumption has caused many environmental problems while promoting the rapid economic development. Over the past few decades, a concentration of carbon dioxide ($CO_2$) in the atmosphere has been increasing, leading to global climate change, which is the most challenging problem of the 21st century. Carbon capture is currently the most promising technology for controlling $CO_2$ emissions. The membrane technology has aroused great interest in industrial separation due to its high energy efficiency, small capital investment, environmental friendliness, and operational continuity. Organic polymer membranes have been successfully commercialized. Compared with inorganic materials, organic polymers have a low production cost and are easy to process. Although polymer membranes have been successfully used in industrial gas separation since the 1980s, there is a trade-off effect between the gas permeability and selectivity of a membrane, and the famous Robeson upper-bound indicates that the selectivity of a membrane decreases with the increase in permeability, resulting in the so-called upper limit of membrane performance.

MMM is a novel gas separation membrane prepared by dispersing a nano-scale inorganic/organic filler in a polymer matrix, which not only solves the problem that the flux and selectivity of a polymer membrane cannot be increased simultaneously but also avoids the inherent brittleness of an inorganic membrane. MMM has become a research hotspot in the field of gas separation membranes. When prepared from two materials with different transfer characteristics, MMM has the potential to synergistically combine the processability of a polymer and the excellent gas separation performance of a porous filling material. MMM combining the advantages of a polymer matrix and an inorganic/organic filler has been extensively studied. With the rapid development of chemistry and material science, advanced porous materials such as carbon molecular sieves (CMSs), zeolite, and MOF materials tend to be designed and used as fillers in recent research to improve the separation performance of MMM.

Among the various materials, MOF materials have attracted widespread attention in the study of heat sources. MOF is a crystalline porous material with a periodic network structure that is formed through self-assembly of inorganic metal centers (metal ions or metal clusters) and organic ligands bridged thereto. MOF is different from both an inorganic porous material and a general organic complex. MOF combines the rigidity of an inorganic material and the flexibility of an organic material, and thus has huge development potential and promising development prospects in the research of modern materials. With characteristics such as porosity, large specific surface area (SSA), adjustable pores, and polymetallic sites, MOF has been widely used in the fields of chemistry and chemical engineering, such as gas storage, molecular separation, catalysis, and sustained drug release. The separation has been the mainstream application, which is attributed to the importance and universality of separation and the fact that MOF is particularly suitable for this challenging industrial process due to its inherent properties. One of the most important and superior properties of MOF materials for separation is that an accurately defined pore size can be controlled in a wide range to allow the size and shape selectivity for guest species. In addition, the chemical variability of an MOF structure can help enhance the adsorption of specific chemicals and improve the separation performance.

However, the process of preparing an MMM from an MOF material is prone to problems such as poor compatibility between an MOF material and a polymer and agglomeration, which affects the separation performance of the prepared membrane material.

SUMMARY

A first objective of the present disclosure is to provide an MMM doped with $M(SiF_6)(pyz)_3$ (M=Cu, Zn, Co, or Ni) or $M(SiF_6)(bpy)_2$. A second objective of the present disclosure is to provide a strategy to prepare an ultrathin MOF-doped MMM through ligand vapor-induced in-situ conversion of a metal salt. A third objective of the present disclosure is to provide a use of the ultra-thin MMM in the $H_2/CO_2$ separation.

An MMM is provided, including a polymer matrix and an $M(SiF_6)(pyz)_3$ nanoparticle or an $M(SiF_6)(bpy)_2$ nanoparticle dispersed in the polymer matrix, where M is selected from the group consisting of Cu, Zn, Co, and Ni, pyz is pyrazine, and bpy is 4,4'-bipyridine.

A content of the nanoparticle in the MMM is 10% to 90%.

The MMM is provided for gas separation.

The MMM is loaded on a carrier.

The MMM has a thickness of 30 nm to 100 nm.

A material of the polymer matrix is polyvinyl alcohol (PVA) or polyethylene glycol (PEG).

A preparation method of the MMM is provided, including the following steps:

step 1: dissolving the polymer matrix in water to obtain a matrix solution, and dissolving an $MSiF_6$ (M=Cu, Zn, Co, or Ni) metal salt in water to obtain a salt solution;

step 2: mixing the matrix solution and the salt solution in a mass ratio to obtain a coating solution, coating the coating solution on a carrier, and conducting evaporation to remove a solvent; and step 3: placing the carrier obtained in the step 2 in a ligand vapor to allow a reaction to obtain the MMM, where the ligand vapor is pyrazine or 4,4'-bipyridine.

In the step 1, a concentration of the polymer matrix in the matrix solution is 2 wt % to 20 wt % and a concentration of the metal salt in the salt solution is 5 wt % to 50 wt %.

In the step 2, the coating is achieved by spin-coating, and the spin-coating is conducted at a rotational speed of 500 rpm to 3,000 rpm 10 to 40 times for 10 s to 60 s each time.

In the step 2, the carrier is a porous polyacrylonitrile (PAN) support.

In the step 2, the evaporation is conducted at 30° C. to 60° C. for 4 h to 24 h.

In the step 3, an ambient temperature range of a pyrazine vapor is 30° C. to 80° C. and the reaction is conducted for 6 h to 24 h.

A use of the MMM in the gas separation of hydrogen/carbon dioxide ($H_2/CO_2$) is provided.

(1) By preparing a dense $MSiF_6$/polymer layer, $MSiF_6$ is uniformly dispersed in the polymer and is fixed, and subsequently, $MSiF_6$ is converted into $M(SiF_6)(pyz)_3$ or $M(SiF_6)(bpy)_2$ (M=Cu, Zn, Co, or Ni) by interacting with a corresponding organic ligand. MOF particles will not agglomerate and no interface defects occur between the MOF particles and the polymer.

(2) $M(SiF_6)(pyz)_3$ (M=Cu, Zn, Co, or Ni) has a pore size between the size of $H_2$ and size of $CO_2$, and thus exhibits prominent screening performance for $H_2/CO_2$. A strong interaction between $Cu(SiF_6)(bpy)_2$ and a $CO_2$ molecule can hinder the transport of the $CO_2$ molecule. The above two MOFs both can achieve the $H_2/CO_2$ separation.

(3) As MOF dominates the MMM and MOF pores serve as the transport channels in the prepared MMM, the MMM doped with a high amount of $M(SiF_6)(pyz)_3$ exhibits gas separation performance much higher than an upper limit of separation performance of a polymer membrane, and the MMM still retains excellent mechanical flexibility and stability.

DESCRIPTION OF THE EMBODIMENTS

Figure 1:
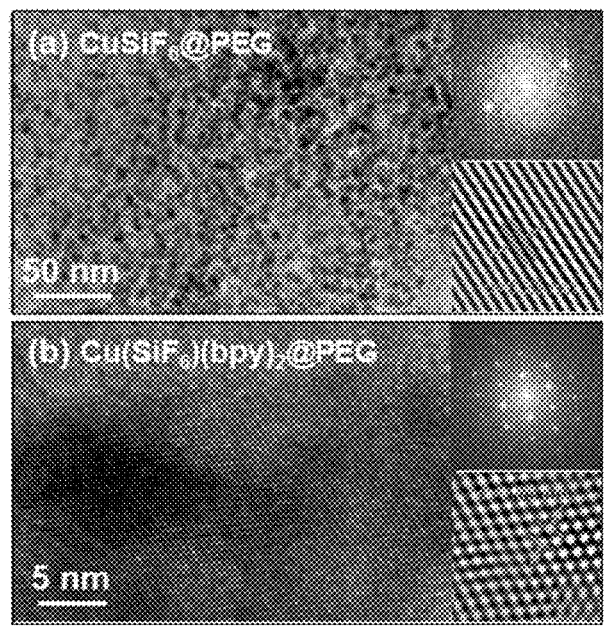
FIG. 1 shows transmission electron microscopy (TEM) characterization results of the $CuSiF_6$@PEG and $Cu(SiF_6)(bpy)_2$@PEG MMMs prepared in Example 1.

The present disclosure provides a strategy to prepare an ultrathin MOF-doped MMM through ligand vapor-induced in-situ conversion of a metal salt, and use thereof in gas separation. The MMM is prepared by placing a metal salt/polymer layer in an organic ligand vapor environment to make the metal salt in-situ converted into an MOF, where the dense metal salt/polymer layer is prepared by spin-coating and drying a corresponding metal salt/polymer aqueous solution, and the polymer plays the roles of anchoring the metal salt and making up for defects among MOF particles. By adjusting a ratio of the metal salt to the polymer in the solution, a doping amount of the MOF can range from 10% to 90%. The in-situ conversion of the metal salt avoids the interface defects caused by post-doping, and the MMM still retains flexibility even at a high doping content. The $H_2/CO_2$ separation performance of the prepared MMM exceeds the upper bound of the polymer membranes in 2008, and the prepared MMM retains prominent stability. The experimental part of this patent is funded by the Jiangsu Province Graduate Research and Practice Innovation Program KYCX21_1170.

The present disclosure adopts the following technical solutions: An MMM doped with $M(SiF_6)(pyz)_3$ (M=Cu, Zn, Co, or Ni) or $Cu(SiF_6)(bpy)_2$ is provided, where a doping amount for the MMM ranges from 10% to 90%; an MOF is $M(SiF_6)(pyz)_3$ (M=Cu, Zn, Co, or Ni) or $Cu(SiF_6)(bpy)_2$; a polymer is water-soluble PVA or PEG; and the MMM preferably has a thickness of 30 nm to 100 nm.

The present disclosure also provides a preparation method of the MMM, specifically including the following steps:

a) a PVA (or PEG) polymer is weighed and dissolved in deionized water to obtain a PVA (PEG) solution with a mass concentration of 2% to 20%;

b) an $MSiF_6$ (M=Cu, Zn, Co, or Ni) metal salt is weighed and dissolved in deionized water to obtain an $MSiF_6$ solution with a mass concentration of 5% to 50%;

c) the $MSiF_6$ solution and the PVA (PEG) solution are mixed to obtain a uniformly-dispersed $MSiF_6$@PVA (PEG) solution, where a mass of the $MSiF_6$ metal salt is 9% to 91% of a total mass of the metal salt and the polymer;

d) the $MSiF_6$@PVA (PEG) solution is spin-coated on a porous PAN support, and the solvent water is removed to obtain a dense $MSiF_6$@PVA (PEG) membrane; and e) the $MSiF_6$@PVA (PEG) membrane is subjected to conversion in an organic vapor atmosphere to obtain the MMM.

In the step d), the spin-coating is conducted at a rotational speed of 500 rpm to 3,000 rpm 10 to 40 times for 10 s to 60 s each time. In the step e), the organic vapor atmosphere is created by placing an organic ligand in a confined space and adjusting the temperature to make the organic ligand volatilized, where the temperature ranges from 30° C. to 80° C.

A preparation method of an MMM based on an $M(SiF_6)(bpy)_2$ nanoparticle is basically the same as the preparation method of the MMM based on the $M(SiF_6)(pyz)_3$ nanoparticle, except that a $CuSiF_6$ solution is used as the metal salt solution and 4,4'-bipyridine is used as the organic vapor.

The present disclosure also provides a use of the ultra-thin MMM in the $H_2/CO_2$ separation. $H_2$ is allowed to preferentially penetrate through the MMM, and the MMM exhibits prominent selectivity for a $H_2/CO_2$ mixed gas and can realize efficient gas separation, which exceeds the polymeric upper bound of $H_2/CO_2$ separation performance. When the MMM is tested, a pressure at a feed side ranges from 0.1 bar to 5 bar; a molar ratio of $H_2$ to $CO_2$ is 1:1 and a corresponding partial pressure of each of $H_2$ to $CO_2$ ranges from 0.05 bar to 2.5 bar; and a test temperature ranges from 10° C. to 40° C.

The present disclosure is described in detail below in conjunction with specific examples, but the present disclosure is not limited to the examples described below. Any variation made within the content and scope of the present disclosure should be included in the technical scope of the present disclosure. The permeability is expressed in a unit of GPU: 1 GPU=$3.35 \times 10^{-10}$ mol m$^{-2}$ s$^{-1}$ Pa$^{-1}$.

Example 1

(1) 100 g of a PEG solution with a mass fraction of 2% and 100 g of a CuSiF$_6$ solution with a mass fraction of 10% were prepared.

(2) 20 g of the PEG solution and 20 g of the CuSiF$_6$ solution were mixed and stirred to obtain a CuSiF$_6$@PEG aqueous solution in which a mass ratio of CuSiF$_6$ to PEG was 5:1.

(3) The CuSiF$_6$@PEG aqueous solution was spin-coated on a PAN support at a rotational speed of 1,500 rpm 40 times for 30 s each time to obtain a CuSiF$_6$@PEG membrane, and the CuSiF$_6$@PEG membrane was dried in an oven at 40° C. for 12 h to remove the solvent water, such that the CuSiF$_6$@PEG membrane was cured.

(4) The CuSiF$_6$@PEG membrane and 1 g of a 4,4'-bipyridine ligand were placed in a reactor with the two not in contact, and the reactor was heated in an oven at 60° C. for 12 h.

Figure 2:
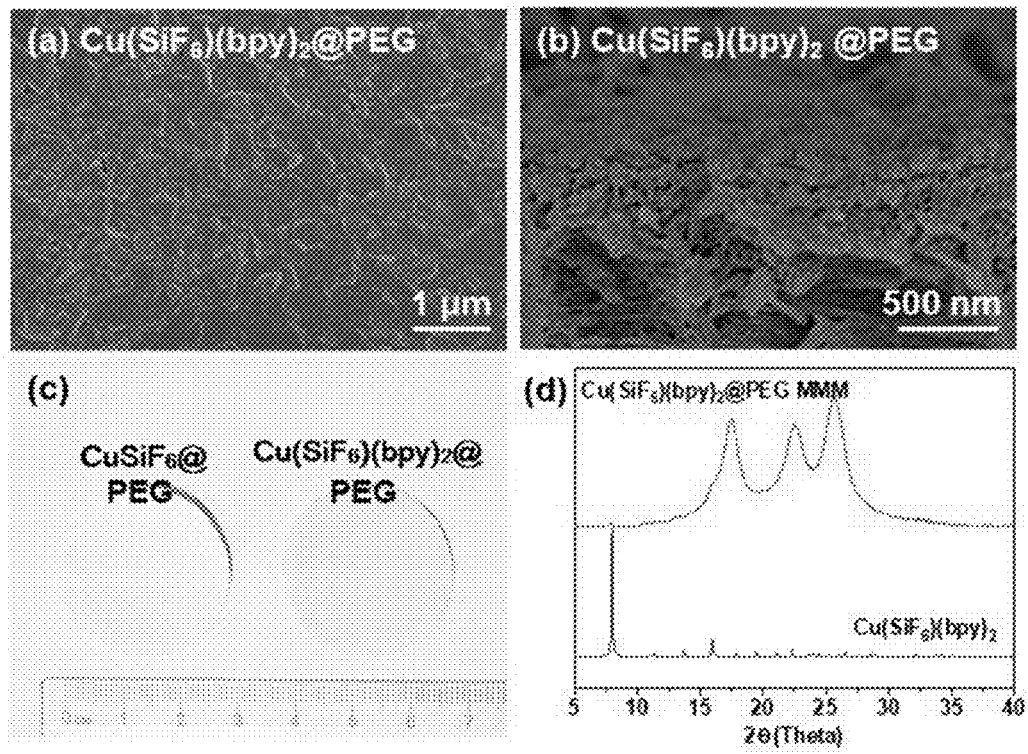
FIG. 2 shows an X-ray diffractometry (XRD) pattern, scanning electron microscopy (SEM) images, and a physical picture of the $Cu(SiF_6)(bpy)_2$@PEG MMM prepared in Example 1.

(5) Material characterization: As shown in FIG. 1, the Cu(SiF$_6$)(bpy)$_2$@PEG MMM obtained after the conversion of the CuSiF$_6$@PEG precursor membrane was subjected to TEM characterization, and an obvious change in the lattice diffraction pattern and an increase in the interplanar crystal spacing were observed. According to Fourier transform infrared spectroscopy (FTIR) analysis of the Cu(SiF$_6$)(bpy)$_2$@PEG MMM, a high-resolution TEM interplanar crystal spacing was 0.55 nm, which was consistent with the (020) crystal plane of the Cu(SiF$_6$)(bpy)$_2$ crystal. As shown in FIG. 2, it can be seen from the SEM images that there are obvious granular protrusions on a surface of the MMM, indicating the presence of MOF particles; and a color change caused by a coordination reaction can be observed in the physical picture. The XRD pattern confirms the in situ synthesis of Cu(SiF$_6$)(pyz)$_3$.

(6) Separation performance characterization: The prepared Cu(SiF$_6$)(bpy)$_2$@PEG was tested, and test results showed that when CuSiF$_6$:PEG=5:1, a conversion rate of CuSiF$_6$ and an MOF doping amount in the MMM were 90.1% and 84%, respectively. Under an intake pressure of 0.5 bar at 30° C., the H$_2$ permeability and the H$_2$/CO$_2$ selectivity of the MMM were 933 GPU and 31, respectively.

Example 2

(1) 100 g of a 5 wt % PEG solution and 100 g of a 10 wt % CuSiF$_6$ solution each were prepared.

(2) CuSiF$_6$@PEG aqueous solutions were prepared according to CuSiF$_6$:PEG mass ratios of 1:1, 2.5:1, 5:1, and 10:1, respectively.

(3) The CuSiF$_6$@PEG aqueous solutions with different mass ratios each were spin-coated on a PAN support at a rotational speed of 2,000 rpm 20 times for 20 s each time to obtain a CuSiF$_6$@PEG membrane, and the CuSiF$_6$@PEG membrane was dried in an oven at 60° C. for 6 h to remove the solvent water, such that the CuSiF$_6$@PEG membrane was cured.

(4) The CuSiF$_6$@PEG membrane and 2 g of a pyrazine ligand were placed in a reactor with the two not in contact, and the reactor was heated in an oven at 60° C. for 24 h.

Figure 3:
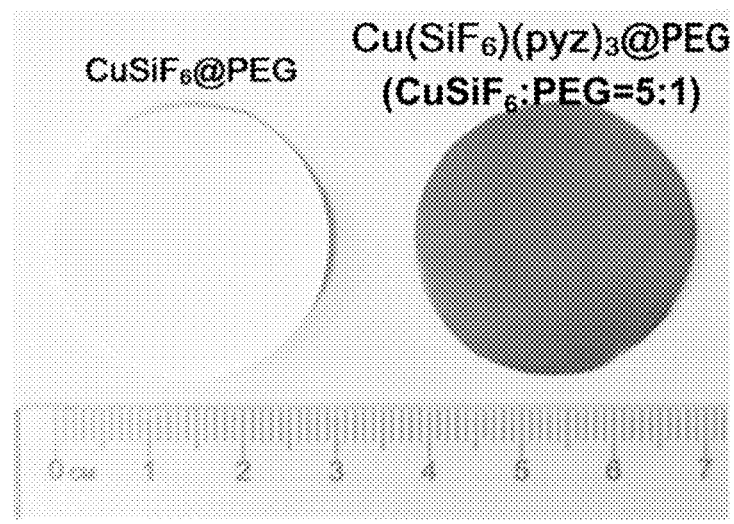
FIG. 3 shows physical pictures of the $CuSiF_6$@PEG membrane and $Cu(SiF_6)(pyz)_3$@PEG MMM with $CuSiF_6$:PEG=5:1 in Example 2.

(5) A color of the prepared Cu(SiF$_6$)(pyz)$_3$@PEG MMM was significantly changed compared with the dense CuSiF$_6$@PEG membrane (FIG. 3). The conversion rate of CuSiF$_6$ and the actual doping amount of Cu(SiF$_6$)(pyz)$_3$ in each of the MMMs with different CuSiF$_6$:PEG ratios are shown in the table below.

| CuSiF$_6$:PEG | 1:1 | 2.5:1 | 5:1 | 10:1 |
|---|---|---|---|---|
| CuSiF$_6$ conversion rate | 82.5% | 85.8% | 96.4% | 94.1% |
| Cu(SiF$_6$)(pyz)$_3$ doping amount | 51.9% | 70.9% | 86.3% | 90.0% |

Figure 4:
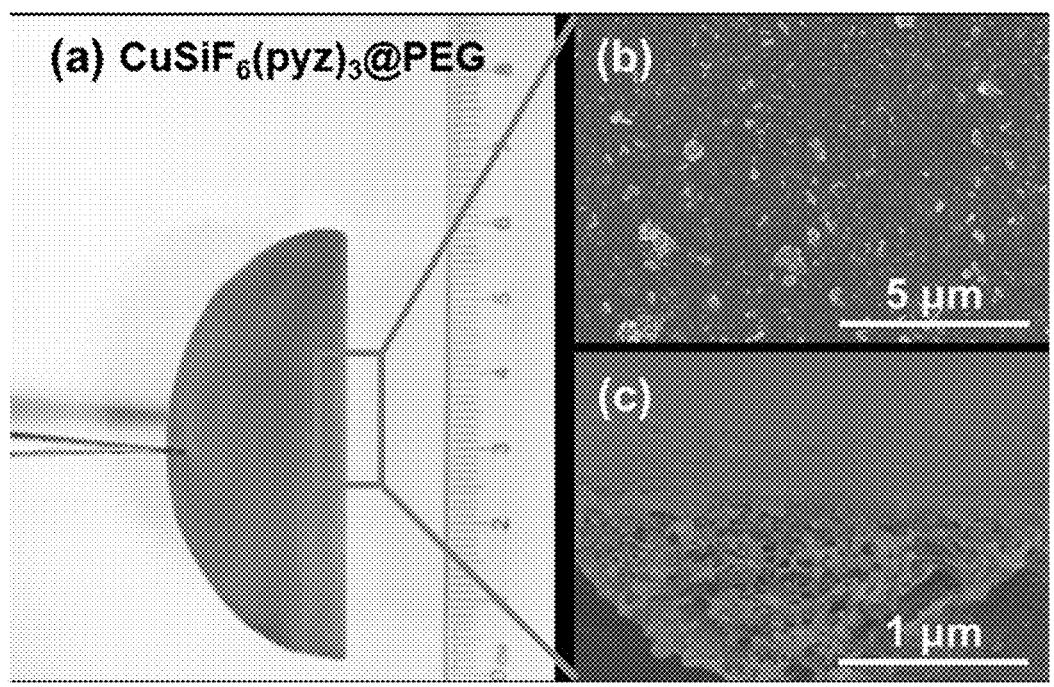
FIG. 4 shows a picture of the $Cu(SiF_6)(pyz)_3$@PEG MMM with $CuSiF_6$:PEG=5:1 in Example 2 in a bending state and corresponding SEM images.

(6) The MMM with a doping amount of 86.3% was bent, and after the bending, there was no obvious defect on an interface of the MMM (FIG. 4) and the separation performance remained unchanged, indicating that, even at an extremely-high doping amount, the MMM still retained excellent mechanical flexibility and stability.

Figure 5:
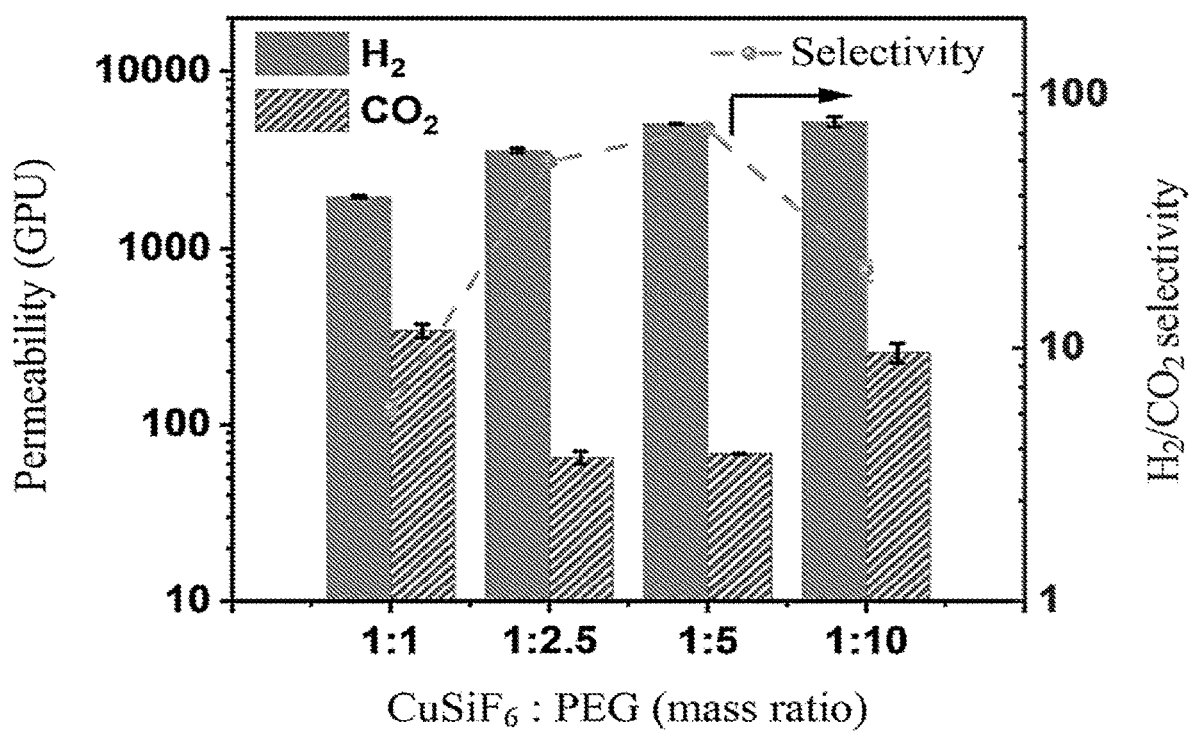
FIG. 5 shows the $H_2/CO_2$ separation performance of the $Cu(SiF_6)(pyz)_3$@PEG MMMs with different $CuSiF_6$:PEG mass ratios in Example 2.

(7) The prepared Cu(SiF$_6$)(pyz)$_3$@PEG was tested. Under an intake pressure of 1 bar at 5° C., the gas permeability and H$_2$/CO$_2$ selectivity of the Cu(SiF$_6$)(pyz)$_3$@PEG MMM are shown in FIG. 5.

Example 3

(1) 500 g of a 20 wt % PEG solution and 20 g of a 50 wt % MSiF$_6$ solution (M=Zn, Co, or Ni) each were prepared.

(2) An MSiF$_6$@PEG aqueous solution was prepared according to an MSiF$_6$:PEG mass ratio of 5:1.

(3) The MSiF$_6$@PEG aqueous solutions with different metal salts each were spin-coated on a PAN support at a rotational speed of 3,000 rpm 30 times for 40 s each time to obtain a CuSiF$_6$@PEG membrane, and the CuSiF$_6$@PEG membrane was dried in an oven at 30° C. for 12 h to remove the solvent water.

(4) The MSiF$_6$@PEG membrane and 2 g of a pyrazine ligand were placed in a reactor with the two not in contact, and the reactor was heated in an oven at 30° C. for 24 h.

Figure 6:
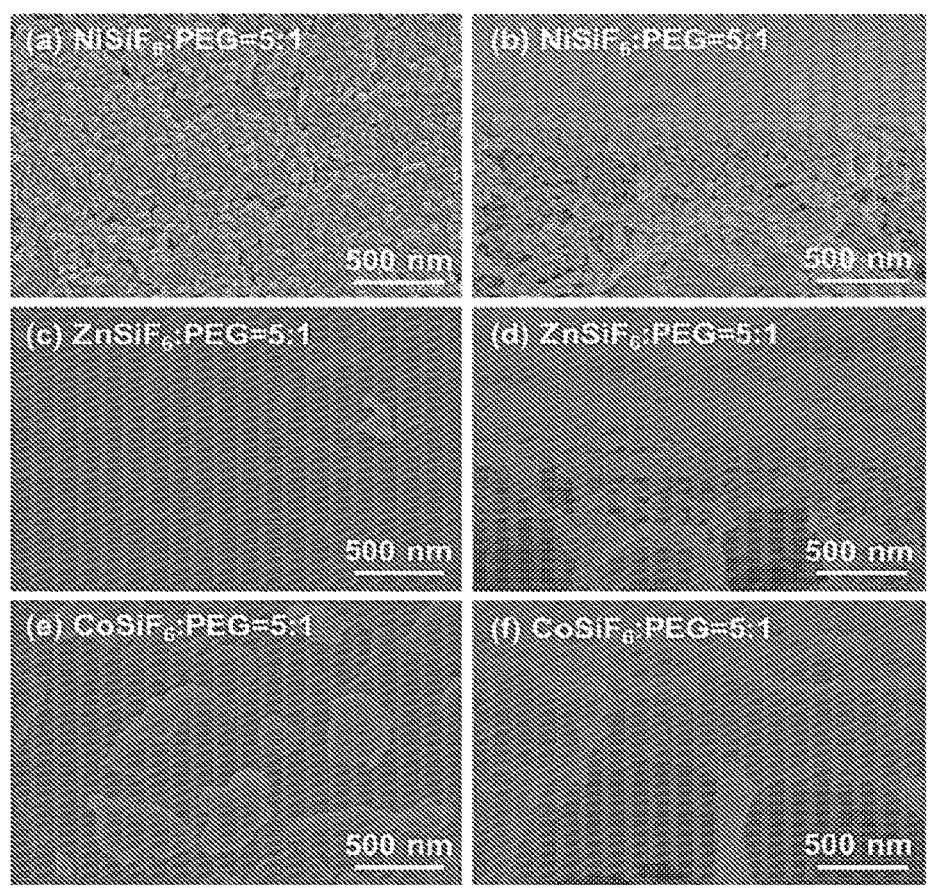
FIG. 6 shows SEM images of the $M(SiF_6)(pyz)_3$@PEG MMMs with different metal salts in Example 3.

(5) The prepared MMM is shown in FIG. 6, and the prepared M(SiF$_6$)(pyz)$_3$@PEG was tested. Doping amounts of M(SiF$_6$)(pyz)$_3$ in the obtained MMMs were 83.4% (Ni), 84.7% (Zn), and 84.3% (Co), respectively. Under an intake pressure of 2 bar at 25° C., the gas permeability and H$_2$/CO$_2$ selectivity of each of the M(SiF$_6$)(pyz)$_3$@PEG MMMs are shown in the table below.

|  | Ni(SiF$_6$)(pyz)$_3$@PEG | Zn(SiF$_6$)(pyz)$_3$@PEG | Co(SiF$_6$)(pyz)$_3$@PEG |
|---|---|---|---|
| H$_2$ permeability (GPU) | 4616.0 | 4977.3 | 1165.8 |
| H$_2$/CO$_2$ selectivity | 29.1 | 47.7 | 37.2 |

Example 4

(1) 50 g of a 10 wt % PEG solution and 20 g of a 5 wt % CuSiF$_6$ solution each were prepared, and the two solutions were mixed to obtain a $CuSiF_6$@PEG aqueous solution in which a mass ratio of $CuSiF_6$ to PEG was 1:5.

(2) The $CuSiF_6$@PEG aqueous solution was spin-coated on a PAN support at a rotational speed of 1,500 rpm 20 times for 30 s each time to obtain a $CuSiF_6$@PEG membrane, and the $CuSiF_6$@PEG membrane was dried in an oven at 30° C. for 24 h to remove the solvent water.

(4) The $CuSiF_6$@PEG membrane and 1 g of a pyrazine ligand were placed in a reactor with the two not in contact, and the reactor was heated in an oven at 60° C. for 24 h.

(5) The prepared $Cu(SiF_6)(pyz)_3$@PEG was tested, and a conversion rate of $CuSiF_6$ and an MOF doping amount in the MMM were 53.4% and 13%, respectively. Under 5 bar at 25° C., the gas permeability and $H_2/CO_2$ selectivity of the $Cu(SiF_6)(pyz)_3$@PEG MMM were 238 GPU and 11.4, respectively.

Example 5

(1) 100 g of a PVA solution with a mass fraction of 2% and 100 g of a $CuSiF_6$ solution with a mass fraction of 5% each were prepared.

(2) 20 g of the PVA solution and 20 g of the $CuSiF_6$ solution were mixed and stirred to obtain a $CuSiF_6$@PVA aqueous solution in which a mass ratio of $CuSiF_6$ to PVA was 2.5:1; and 25 g of the PVA solution and 10 g of the $CuSiF_6$ solution were mixed and stirred to obtain a $CuSiF_6$@PVA aqueous solution in which a mass ratio of $CuSiF_6$ to PVA was 1:1.

(3) The $CuSiF_6$@PVA aqueous solutions with different mass ratios each were spin-coated on a PAN support at a rotational speed of 1,500 rpm 20 times for 30 s each time to obtain a $CuSiF_6$@PVA membrane, and the $CuSiF_6$@PVA membrane was dried in an oven at 40° C. for 12 h to remove the solvent water, such that the $CuSiF_6$@PVA membrane was cured.

(4) The $CuSiF_6$@PVA membrane and 1 g of a pyrazine ligand were placed in a reactor with the two not in contact, and the reactor was heated in an oven at 60° C. for 12 h.

(5) The prepared $Cu(SiF_6)(pyz)_3$@PVA was tested at a temperature of 25° C. and a pressure of 0.1 bar. The results showed that when $CuSiF_6$: PVA=2.5:1, a conversion rate of $CuSiF_6$ was 91%, an MOF doping amount was 77%, and the $H_2$ permeability and $H_2/CO_2$ selectivity of the $Cu(SiF_6)(pyz)_3$@PVA MMM were 364.9 GPU and 30.0, respectively; and when $CuSiF_6$: PVA=1:1, a conversion rate of $CuSiF_6$ was 84%, an MOF doping amount was 55%, and the $H_2$ permeability and $H_2/CO_2$ selectivity of the $Cu(SiF_6)(pyz)_3$@PVA MMM were 310.5 GPU and 10.9, respectively.

Comparative Example 1

This comparative example was provided to illustrate that, when a $Cu(SiF_6)(pyz)_3$ MOF particle was directly doped into a polymer to prepare an MMM, the separation performance was not significantly improved due to agglomeration.

(1) 0.9 g, 0.8 g, 0.7 g, and 0.6 g of a polysulfone (PSF) polymer each were weighed and added to 4 mL of a tetrahydrofuran (THF) solution, and the resulting solution was stirred for 1 h until PSF was completely dissolved to obtain a homogeneous polymer solution A.

(2) 0.1 g, 0.2 g, 0.3 g, and 0.4 g of a $Cu(SiF_6)(pyz)_3$ MOF particle each were weighed and dispersed in 4 mL of THF to obtain an MOF dispersion B.

(3) The MOF dispersion was added by a dropper dropwise to the polymer solution with a total mass of the MOF and polymer being 1 g to obtain casting solutions with MOF doping amounts of 10%, 20%, 30%, and 40%, respectively. The casting solutions each were stirred in a fume hood for 48 h to allow thorough dispersion for the casting solutions. A scraper and a glass plate with a tin foil tape were placed in a glove bag, the glove bag was inflated by introducing nitrogen, and a THF atmosphere was created in the glove bag. The casting solution was coated on the glass plate with the 300 μm scraper to prepare a $Cu(SiF_6)(pyz)_3$/PSF MMM, and when the organic solvent was completely volatilized, the membrane was taken out, dried at room temperature for 24 h, and aged in a vacuum drying oven at 60° C. for 24 h to obtain a membrane with a thickness of about 50 μm.

Figure 7:
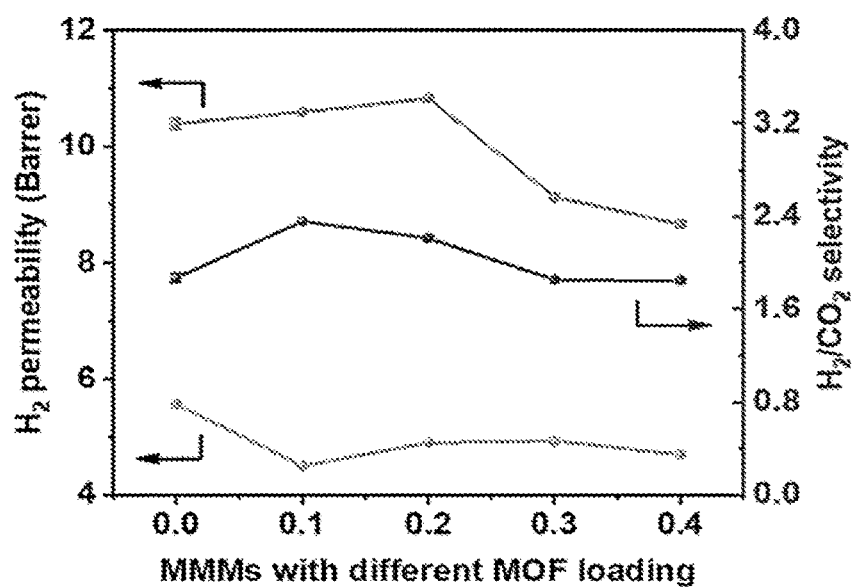
FIG. 7 shows the comparison of separation performance among MMMs obtained under different loading conditions in Comparative Example 1.

(4) The membrane was subjected to a single-component performance test at 0.1 MPa and 25° C., and test results are shown in FIG. 7. An MMM with an MOF doping amount of 10% had the optimal selectivity, and an MMM with an MOF doping amount of 20% had the optimal $H_2$ permeability. However, the MOF brought limited performance improvement.

In this comparative example, the PSF polymer was used as a control because the direct mixing of the $Cu(SiF_6)(pyz)_3$ MOF particle with an aqueous solution system would cause the dissolution of the MOF material.

Comparative Example 2

This comparative example was provided to illustrate that, when a $Cu(SiF_6)(pyz)_3$ MOF particle was directly prepared into an MMM, the membrane had the bendability defect due to agglomeration.

(1) 0.2 g of a PSF polymer was weighed and added to 2 mL of a THF solution, and the resulting solution was stirred for 1 h until PSF was completely dissolved to obtain a homogeneous polymer solution A.

(2) 0.8 g of a $Cu(SiF_6)(pyz)_3$ MOF particle was weighed and dispersed in 4 mL of THF to obtain an MOF dispersion B.

(3) The polymer solution was added dropwise to the MOF dispersion to obtain a casting solution in which a mass proportion of MOF was 80%. The casting solution was stirred in a fume hood for 48 h to allow thorough dispersion for the casting solution. A scraper and a glass plate with a tin foil tape were placed in a glove bag, the glove bag was inflated by introducing nitrogen, and a THF atmosphere was created in the glove bag. The casting solution was coated on the glass plate with the 300 μm scraper to prepare a $Cu(SiF_6)(pyz)_3$/PSF MMM, and when the organic solvent was completely volatilized, the membrane was taken out, dried at room temperature for 24 h, and aged in a vacuum drying oven at 60° C. for 24 h to obtain a membrane with a thickness of about 50 μm.

Figure 8:
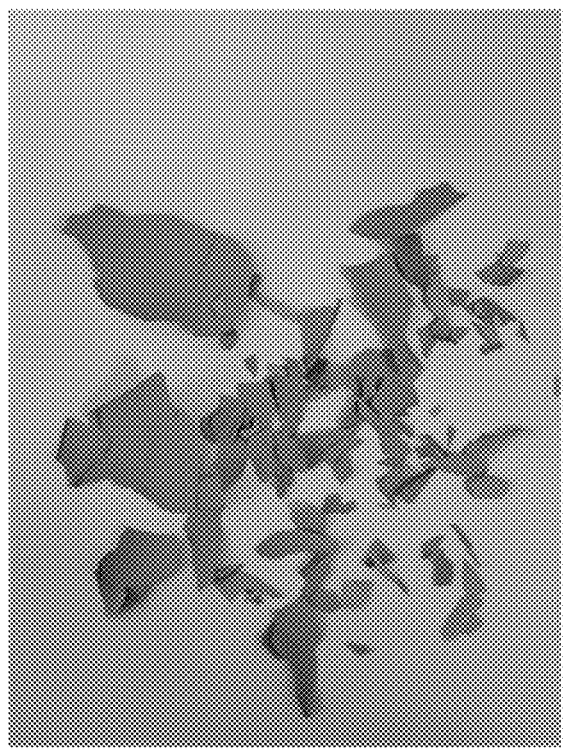
FIG. 8 is a physical picture of an 80% $Cu(SiF_6)(pyz)_3$/PSf MMM.
Figure 9:
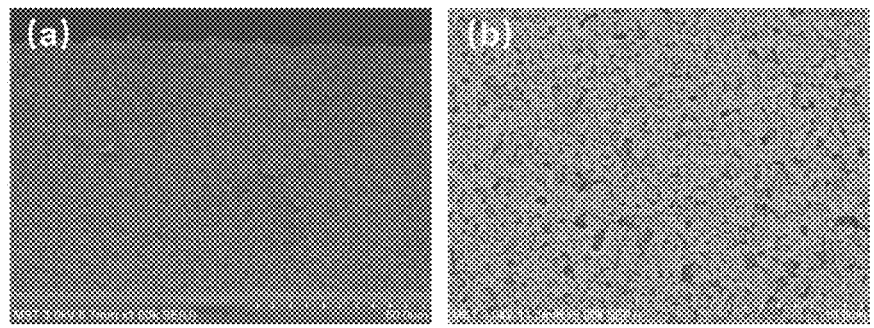
FIG. 9 shows electron microscopy (EM) images of an 80% $Cu(SiF_6)(pyz)_3$/PSf MMM.

(4) The membrane was subjected to a single-component performance test at 0.1 MPa and 25° C. However, because an amount of the polymer in the MMM was too low, the MMM exhibited extremely high brittleness and thus could not undergo a gas permeability test. A physical picture of the membrane is shown in FIG. 8. The EM characterization of the MMM (FIG. 9) showed that there were obvious interface defects among MOF particles in the MMM, and there was basically no polymer coating among the particles, which was also the main reason for the increase in brittleness of the MMM.

Comparative Example 3

This comparative example was different from Example 1 in that: a PEG or PVA solution without the MOF particle was directly spin-coated to prepare a polymer membrane, and the gas permeability and $H_2/CO_2$ selectivity were tested. A PEG aqueous solution with a mass fraction of 5% and a PVA aqueous solution with a mass fraction of 2% each were prepared and spin-coated on a PAN support at a rotational speed of 1,500 rpm 20 times for 30 s each time to obtain a PEG membrane and a PVA membrane, and the PEG membrane and PVA membrane each were placed in an oven at 60° C. for 24 h to remove the solvent, and then taken out and subjected to a gas permeability test. At a temperature of 25° C. and a pressure of 1 bar, the separation performance of the PEG membrane was tested: $H_2$ permeability: 221.8 GPU, and $H_2/CO_2$ selectivity: 3.4; and the separation performance of the PVA membrane was tested: $H_2$ permeability: 98.8 GPU, and $H_2/CO_2$ selectivity: 4.1. The $H_2/CO_2$ selectivity of each of the PEG membrane and the PVA membrane was slightly lower than that of Knudsen diffusion, indicating that the two did not have the screening ability for $H_2$ and $CO_2$ systems.

What is claimed is:

1. A method for separating a hydrogen/carbon dioxide mixed gas, comprising:
   using a mixed matrix membrane to separate the hydrogen/carbon dioxide mixed gas at a temperature from 10° C. to 40° C. to allow hydrogen preferentially penetrate through the mixed matrix membrane to separate the hydrogen from the carbon dioxide,
   wherein a pressure at a feed side of the mixed matrix membrane ranges from 0.1 bar to 5 bar; a molar ratio of the hydrogen to the carbon dioxide is 1:1 and a corresponding partial pressure of each of the hydrogen and the carbon dioxide ranges from 0.05 bar to 2.5 bar;
   wherein the mixed matrix membrane comprises a polymer matrix and an $M(SiF_6)(pyz)_3$ nanoparticle dispersed in the polymer matrix, wherein M is selected from the group consisting of Cu, Zn, Co, and Ni, pyz is pyrazine; and
   the mixed matrix membrane is prepared by the following steps;

step 1: dissolving the polymer matrix in water to obtain a matrix solution, and dissolving an $MSiF_6$ metal salt in water to obtain a salt solution;
   step 2: mixing the matrix solution and the salt solution in a mass ratio to obtain a coating solution, coating the coating solution on a carrier, and conducting evaporation to remove a solvent, wherein during the mixing, a mass of the $MSiF_6$ metal salt is 9% to 91% of a total mass of the metal salt and the polymer matrix; and
   step 3: placing the carrier obtained in the step 2 in a ligand vapor to allow a reaction to obtain the mixed matrix membrane, wherein the ligand vapor is pyrazine.

2. The method according to claim 1, wherein a content of the nanoparticle in the mixed matrix membrane is 10% to 90%; the mixed matrix membrane is provided for gas separation; and the mixed matrix membrane is loaded on the carrier.

3. The method according to claim 1, wherein the mixed matrix membrane has a thickness of 30 nm to 100 nm.

4. The method according to claim 1, wherein a material of the polymer matrix is polyvinyl alcohol or polyethylene glycol.

5. The method according to claim 1, wherein in the step 1, a concentration of the polymer matrix in the matrix solution is 2 wt % to 20 wt % and a concentration of the metal salt in the salt solution is 5 wt % to 50 wt %.

6. The method according to claim 1, wherein in the step 2, the coating is achieved by spin-coating, and the spin-coating is conducted at a rotational speed of 500 rpm to 3,000 rpm 10 to 40 times for 10 s to 60 s each time; and the carrier is a porous polyacrylonitrile support.

7. The method according to claim 1, wherein the evaporation is conducted at 30° C. to 60° C. for 4 h to 24 h.

8. The method according to claim 1, wherein an ambient temperature range of the ligand vapor is 30° C. to 80° C. and the reaction is conducted for 6 h to 24 h.

* * * * *